United States Patent
Brendel et al.

(10) Patent No.: US 6,497,177 B2
(45) Date of Patent: Dec. 24, 2002

(54) CALENDER ARRANGEMENT AND A DEFLECTION CONTROLLED ROLL AND METHOD OF OPERATING THEM

(75) Inventors: Bernhard Brendel, Grefrath (DE); Peter Svenka, Grefrath (DE)

(73) Assignee: Eduard Küsters Maschinenfabrik GmbH & Co. KG, Krefeld (DE)

( * ) Notice: Subject to any disclaimer, the term of this patent is extended or adjusted under 35 U.S.C. 154(b) by 0 days.

(21) Appl. No.: 10/007,316

(22) Filed: Nov. 7, 2001

(65) Prior Publication Data

US 2002/0088353 A1 Jul. 11, 2002

Related U.S. Application Data

(63) Continuation-in-part of application No. 09/297,394, filed on Jun. 10, 1999, now abandoned.

(51) Int. Cl.[7] .................................................. D01G 1/02
(52) U.S. Cl. ........................ 100/35; 100/47; 100/162 B; 100/163 A; 492/7; 492/20
(58) Field of Search ........................ 100/35, 47, 162 B, 100/163 R, 163 A; 492/7, 20

(56) References Cited

U.S. PATENT DOCUMENTS

| | | |
|---|---|---|
| 4,068,360 A | 1/1978 | Freuler |
| 4,729,153 A | 3/1988 | Pav et al. |
| 5,033,176 A | 7/1991 | Schiel |

FOREIGN PATENT DOCUMENTS

| | | |
|---|---|---|
| DE | 30 04 913 A1 | 8/1981 |
| DE | 30 04 913 C2 | 7/1982 |
| DE | 31 17398 A1 | 11/1982 |
| DE | 3119387 A1 * | 11/1982 |
| DE | 29 43644 C2 | 2/1988 |
| DE | 3416210 C2 | 8/1988 |
| DE | 39 09911 C1 | 6/1990 |
| DE | 39 18 989 C1 | 12/1990 |
| DE | 42 03497 A1 | 8/1993 |
| DE | 3820974 C3 * | 3/1996 |

* cited by examiner

*Primary Examiner*—Stephen F. Gerrity
(74) *Attorney, Agent, or Firm*—Townsend and Townsend and Crew LLP

(57) ABSTRACT

A calender arrangement includes end rolls that are in the form of deflection controlled rolls having an internal stroke. One of the end rolls comprises at least one stop element that is in the form of a hydraulic positioned hydrostatic element which, together with the internal wall of the roll sleeve, defines a gap. When a constant throughput of hydraulic medium is fed in, an equilibrium of forces is produced, at which equilibrium the roll sleeve is positioned. The pressure built up in the process is a measure of the positioning forces. Small departures from the target position are permitted without control intervention.

29 Claims, 14 Drawing Sheets

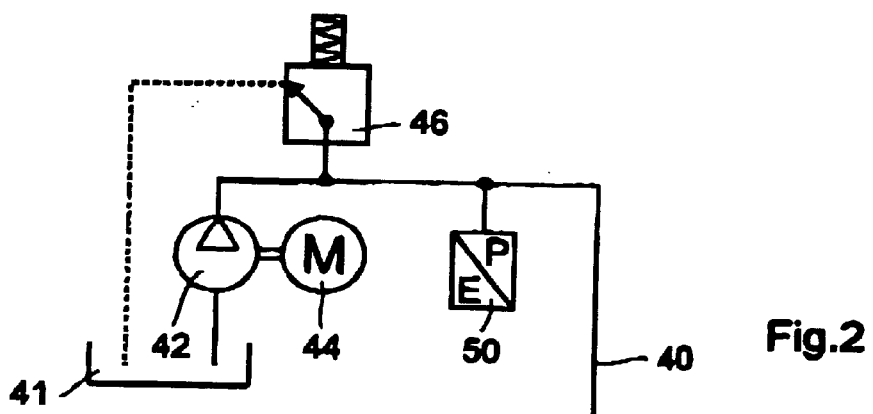
Fig.2
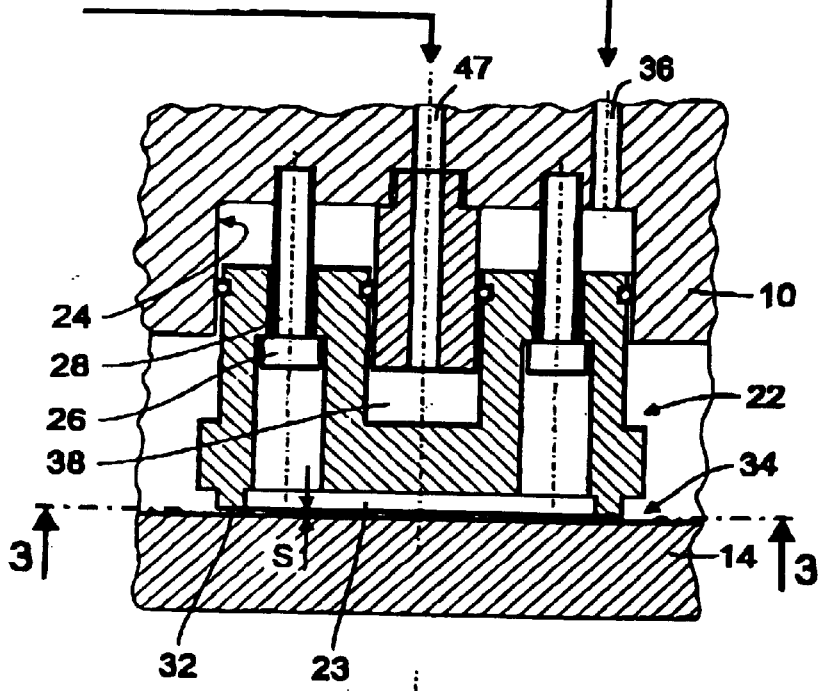
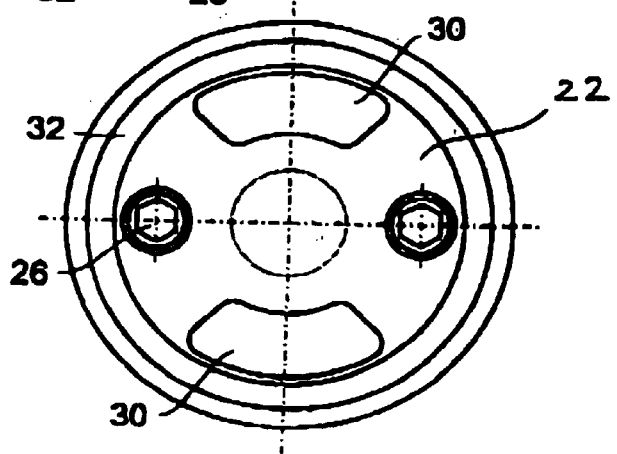
Fig.3

CALENDER ARRANGEMENT AND A DEFLECTION CONTROLLED ROLL AND METHOD OF OPERATING THEM

CROSS-REFERENCES TO RELATED APPLICATIONS

This application is,a continuation-in-part of application Ser. No. 09/297,394, filed on Jun. 10, 1999 (now abandoned) the full disclosure of which is incorporated herein by reference.

BACKGROUND OF THE INVENTION

The invention relates to a calender arrangement for treating a product web, especially a paper web. The invention relates also to a deflection controlled roll having internal roll sleeve stroke and to a method of fixing an operating position of such a deflection controlled roll when it is being used as an end roll in a stack of rolls of a calender arrangement.

From DE 30 04 913 C2 it is known to use a deflection controlled roll both for the upper and lower end roll of a stack of rolls in a calender, in which deflection controlled roll the roll sleeve is supported by hydrostatic sleeve support elements on a roll axle that is secured against rotation in lateral bearings, and is movable vertically relative to the roll axle, that is to say it is provided with an internal roll sleeve stroke. The intermediate rolls of the stack of rolls are also configured so as to be movable vertically. Since the vertical position of the entire stack of rolls must be preset in some manner during operation, stops are provided for that purpose. The roll axle of each deflection controlled roll accordingly passes through a vertical elongate hole in a bearing side support of the roll sleeve in such a manner that the roll sleeve is movable vertically relative to the roll axle within the range of the elongate hole. Under the influence of the sleeve and loading arrangement, the roll sleeve of one end roll moves in the vertical direction until at both its ends it comes to rest with the stop of the elongate hole against a counterstop associated with the roll axle and thus reaches a defined preset position (operating position) of the roll sleeve and therefore of the entire stack of rolls, and is held in that operating position during operation. A disadvantage therein is that during operation of the calender unavoidable vibrations of the machine parts. intensified by a rigid mechanical stop, are transferred to the roll sleeve and to the entire roll system and may result in an impairment of the product web to be treated. It is a further disadvantage that only one position, namely the outermost eccentric position of the roll sleeve stroke, which is provided by a rigid mechanical stop, serves to preset the operating position. The fact that the roll sleeve is supported in the stop also means that the line load profile has restricted (limited) controllability.

From DE 34 16 210 C2 there is known a roll press having an end roll, in which the roll sleeve is mounted near its end on the associated roll axle. Arranged in the region of the bearings are force sensors, the output signals of which so influence a controller for the supporting forces of the hydrostatic support elements acting upon an internal circumference of the roll sleeve that the detected forces are minimized, that is to say, as small forces as possible are transferred to the roll sleeve by way of the bearings. In the development of that arrangement according to DE 39 09 911 C1, hydraulic force sensors are used. A disadvantage thereof is that such an end roll without internal roll sleeve stroke relative to the roll axle cannot be used as a self-loading deflection controlled roll that enables substantially more precise setting and control of the loading forces, that is to say of the line load profile. A further disadvantage is the complexity of the control system and the limitation to only one vertical operating position of the roll sleeve.

The same disadvantages affect the roll arrangement according to DE 29 43 644 C2 in which the relative heights of the roll axle and roll sleeve of an end roll are so controlled that the roll axle adopts an approximately middle position in the roll sleeve.

From DE 39 18 989 C1 it is known, in a deflection controlled roll, for the vertical extension movement of hydrostatic support elements that bear against the roll axle so as to be vertically displaceable and that act by at least one open hydrostatic bearing pocket against an internal circumference of the roll sleeve to be limited by means of stops. When a stop is reached, the support element is secured mechanically and cannot extend further. This results in a specific positioning of the roll sleeve relative to the roll axle. A disadvantage thereof is that the positioning is effected by the actual transmission of forces for setting the line load and, consequently, alters with the latter, resulting in changes in reference position in dependence upon changes in the transmission of forces.

Finally, from DE 42 03 497 A1 there is known a compensating roll for the pressure treatment of product webs, consisting of a stationary roll core surrounded by a rotating roll sleeve which is supported on the roll axle and is vertically displaceable by means of hydraulic support elements lying next to one another, the support elements being arranged on two diametrical lines of the envelope of the roll axle. As a result of the hydraulic support elements' being acted upon by pressure medium at specific pressure values, the resulting forces co-operate and enable the longitudinal and sectional deformation of the roll sleeve. A disadvantage thereof is that such a compensating roll is configured without an internal roll sleeve stroke, so that the above-mentioned disadvantages occur in this case also.

The problem underlying the invention is therefore so to configure a calender arrangement so that one and the same device enables positioning of the roll sleeve of a self-loading end roll having an internal sleeve stroke, which carries intermediate rolls, held so as to be displaceable vertically, of a stack of rolls and is thus able to set a desired line load profile in the roll nip precisely, and enables detection and control of the forces acting in the positioning region.

A further problem is to provide a deflection controlled roll which enables positioning of the roll sleeve relative to the roll axle in an operating position without substantial additional expenditure.

SUMMARY OF THE INVENTION

A calender arrangement is accordingly provided in which an end roll is configured as a deflection controlled roll having internal stroke and is arranged to be fitted with the device for positioning the roll sleeve relative to the roll axle. In the operating state of the calender, the roll sleeve is held in an operating position by means of the positioning device. The roll sleeve carries displaceable intermediate rolls of a stack of rolls. Mounting the roll sleeve on support elements and on at least one stop element enables extremely precise setting and control of a line load profile in the entire roll nip.

The opposite end roll can also be configured as a deflection controlled roll having internal stroke and which can be equipped in the same manner as the one end roll.

The term "pseudo-stop" is intended to show that the position of the roll sleeve relative to the axle is not determined by mechanical components lying next to one another, but that the hydraulic medium film is interposed in the through gap between the stop element and the roll sleeve. The height of the through gap depends upon the pressure of the hydraulic medium that is fed in, which is a measure of the positioning forces.

A deflection controlled roll having internal roll sleeve stroke is provided that enables positioning of the roll sleeve by hydraulic means. The hydraulic stopper operates by virtue of the limited element stroke, which secures it on the roll axle with a selectable stroke, in the manner of an overflow valve, and thus stops and holds the roll sleeve in a selectable operating position. Within the range of the internal stroke, the deflection controlled roll can accordingly be displaced to a predeterminable position and fixed there.

If the hydrostatic bearing pocket of a stopper that has been pushed to the maximum stroke is supplied with a constant oil or pressure medium flow, a pressure can build up in that bearing pocket when the internal circumference of the roll sleeve draws closer to the bearing pocket. The pressure can build up to a predeterminable target value at which the bearing pocket rests against the internal circumference of the roll sleeve with a seal gap of a specific gap height resulting from the flow through the gap corresponding to the target pressure value. If that specific gap height is reduced as a result of external disturbing forces, the pressure in the bearing pocket rises and produces an opposite force. If the specific gap height is increased as a result of external disturbing forces, the pressure in the bearing pocket falls, as a result of which an opposite force is likewise produced.

Such a hydraulically positioned hydrostatic stopper is not involved in the actual transmission of forces. A target oil pressure can thus be so set to obtain a specific rigidity of fixing, that is to say the system is, on the one hand, not too rigid but, on the other hand, is not too yielding. The damping of oscillation can thus be optimized.

The hydraulically positioned hydrostatic stopper in the form of a piston/cylinder unit can also be provided with a piston diameter that is different from that of the actual load transmission elements, that is to say the support elements, in order to be able to influence the supporting forces of those elements further. The same applies also to the sealing edge widths of the hydraulically hydrostatic stoppers.

Rises and falls in pressure in the bearing pocket of a stopper are additionally indicators of undesired radial roll sleeve displacements. The changes in pressure value in the bearing pockets can therefore be measured and used as control signals for regulating the supporting forces of the support elements. If, for example, the pressure in the bearing pocket of a stopper rises above the target pressure value as a result of direct or indirect vertical roll sleeve displacements, that rise in pressure can, when a predeterminable maximum pressure value has been reached, trigger a control signal which can be sent to a controller for the support elements which alters the supporting forces in such a manner that the target pressure value is restored. If the pressure in the bearing pocket falls below the target value, a control signal can likewise be sent to the controller for the support elements when a predeterminable minimum pressure value has been reached, and the controller can alter the supporting forces in such a manner that the target pressure value is restored. The roll sleeve is thus hydraulically clamped at the predetermined operating position and held there.

The effective range of the securing can also be determined by way of a target pressure in a bearing pocket of the stopper. The effective range is firstly the difference between the target pressure and a maximum pressure in the bearing pocket, which can be firmly predetermined by way of a pressure limiting valve in a pressure fluid supply line, and secondly the difference between the target pressure and the minimum pressure in the bearing pocket, which can be determined by means of the selected target pressure. Forces are thus controlled. In that manner, the roll and the roll sleeve can be protected from being destroyed. The target pressure of a stopper can be selected as desired, since it can be taken into account as a value that can be firmly set in the profile calculations, its value not being the result of the oil pressure optimization in the support elements.

It is also advantageous if at least two stoppers are arranged in such a manner that they lie approximately at the quarter points of the roll, because there they produce the smallest profile errors, considering the intermediately supported rolls, when there are departures from a target pressure.

It is also advantageous for the stoppers for positioning the roll sleeve to be incorporated additionally into the roll as independent backward-facing elements having independent pressure fluid supplies.

It is also advantageous to incorporate the deflection controlled roll according to the invention into a calender in such a manner that the stoppers are arranged on the backward-facing side of the roll. In the event of pressure changes, which are admittedly small in troublefree normal operation, local departures from the line loading can thus be minimized.

Further developments and advantages of the invention can be found in the following description and in the dependent claims.

The invention will be explained hereinafter in greater detail with reference to the embodiments shown in the attached drawings.

BRIEF DESCRIPTION OF THE DRAWINGS

FIG. 2 is an axial section through a stopper according to FIG. 1 and shows also the hydraulic medium supply line;

FIG. 3 is a section according to line 3—3 in FIG. 2;

FIG. 4 is a pressure/nip width graph;

DETAILED DESCRIPTION OF THE INVENTION

Figure 1:
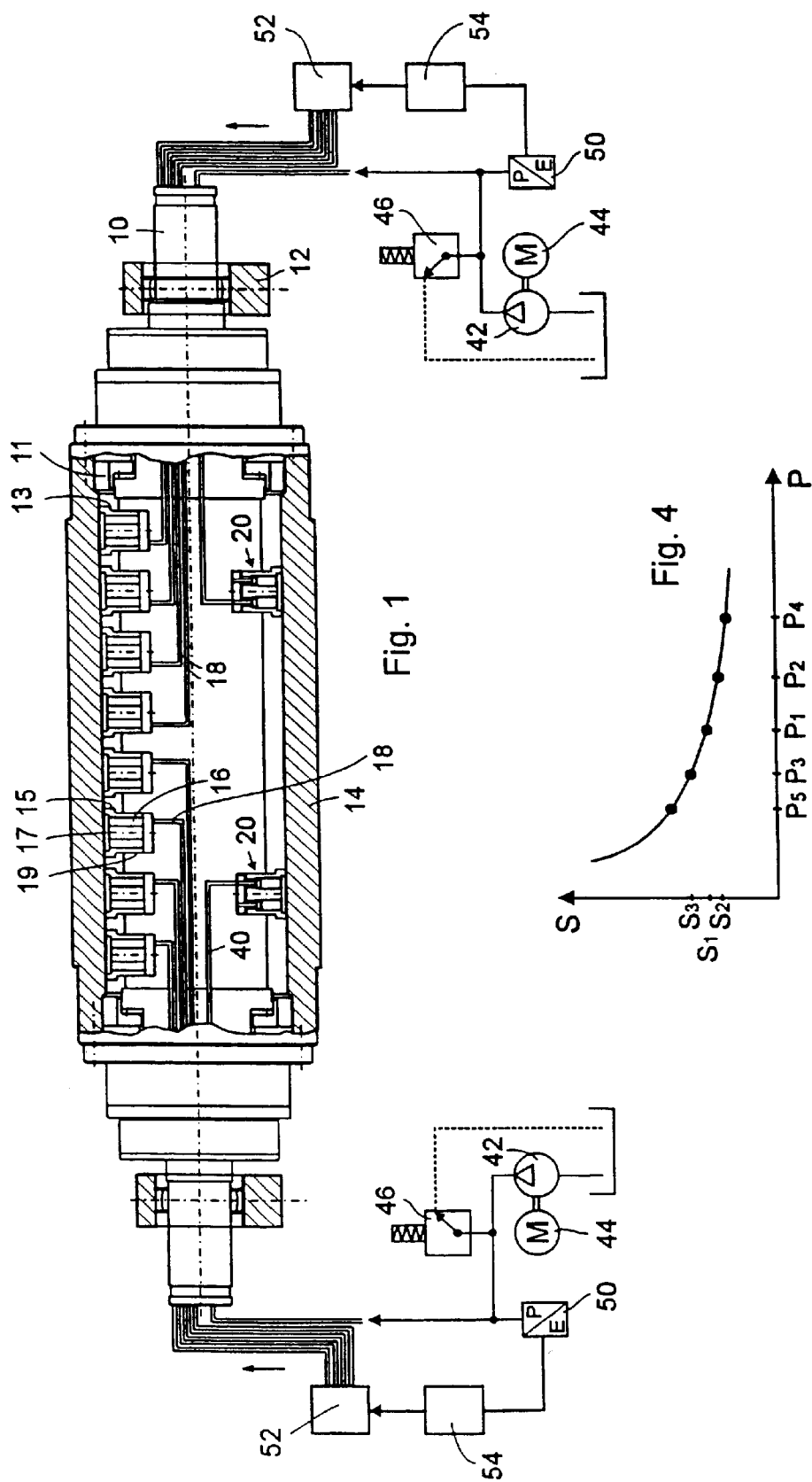
FIG. 1 is a longitudinal section of a deflection controlled roll having stoppers according to a first embodiment.
Figure 5A:
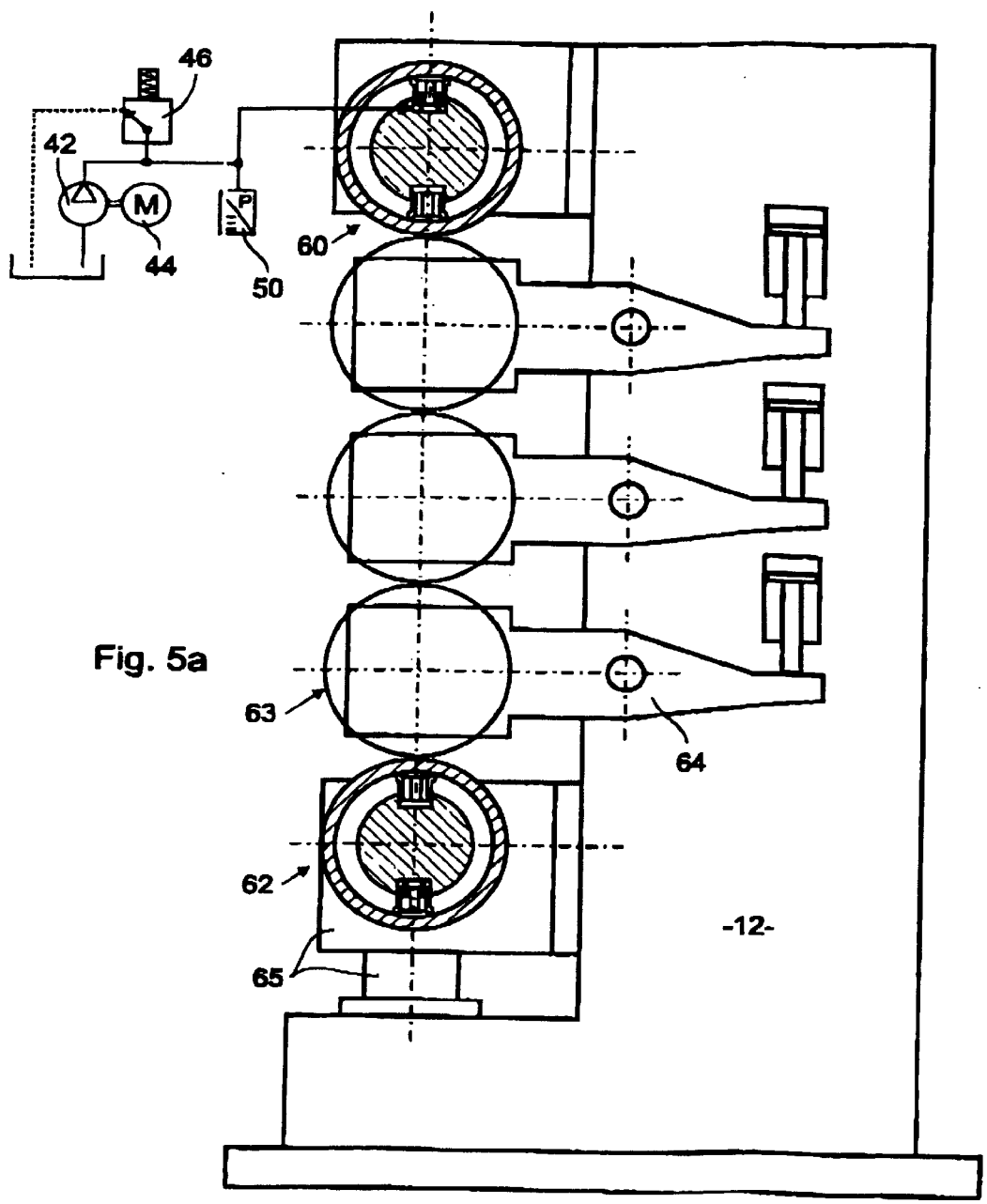
FIGS. 5a–5c are diagrammatic side views of three calender arrangements according to the invention having deflection controlled rolls according to FIG. 1 where the stack planes are vertical, oblique, and horizontal, respectively.
Figure 5B:
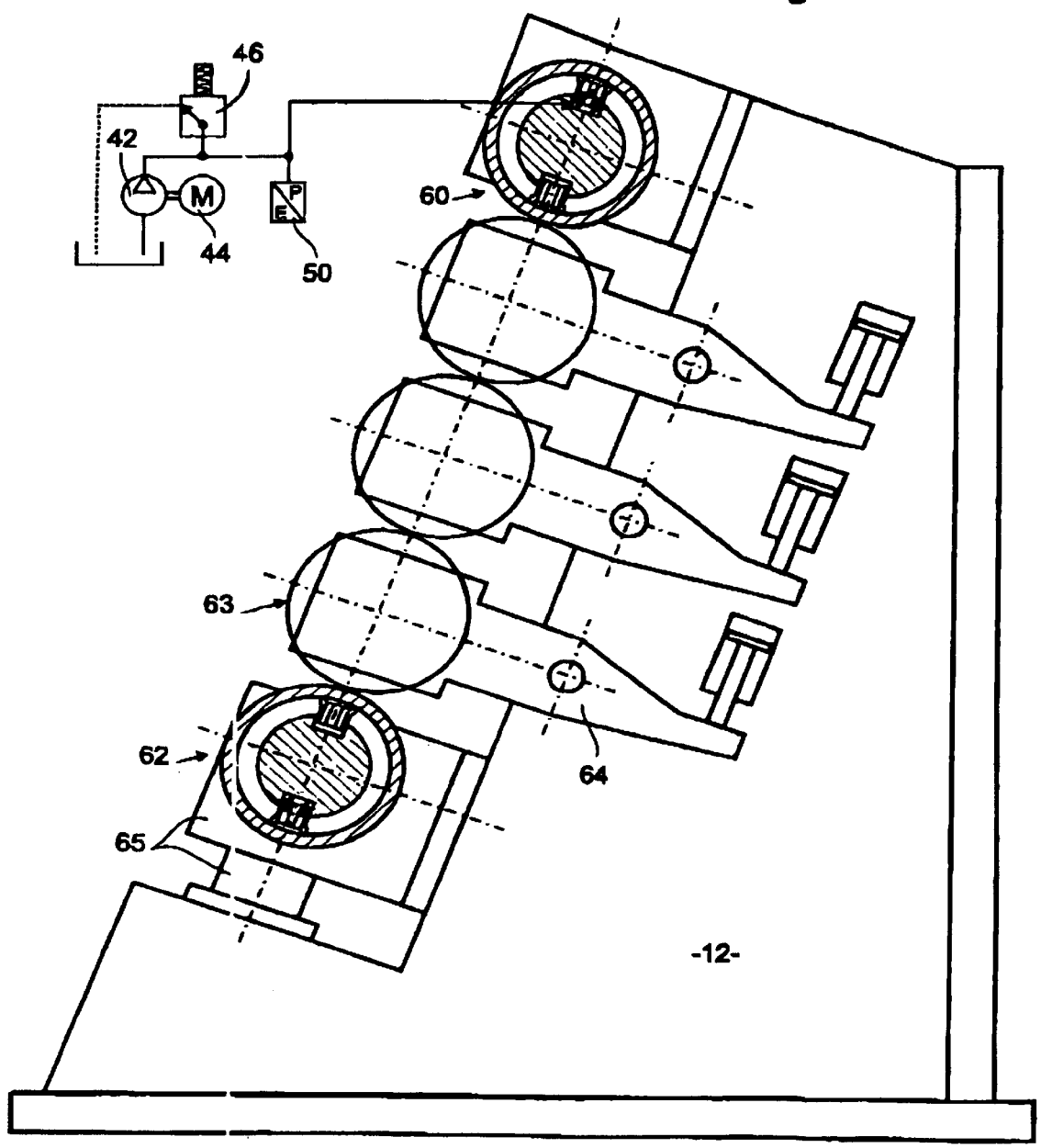
Figure 5C:
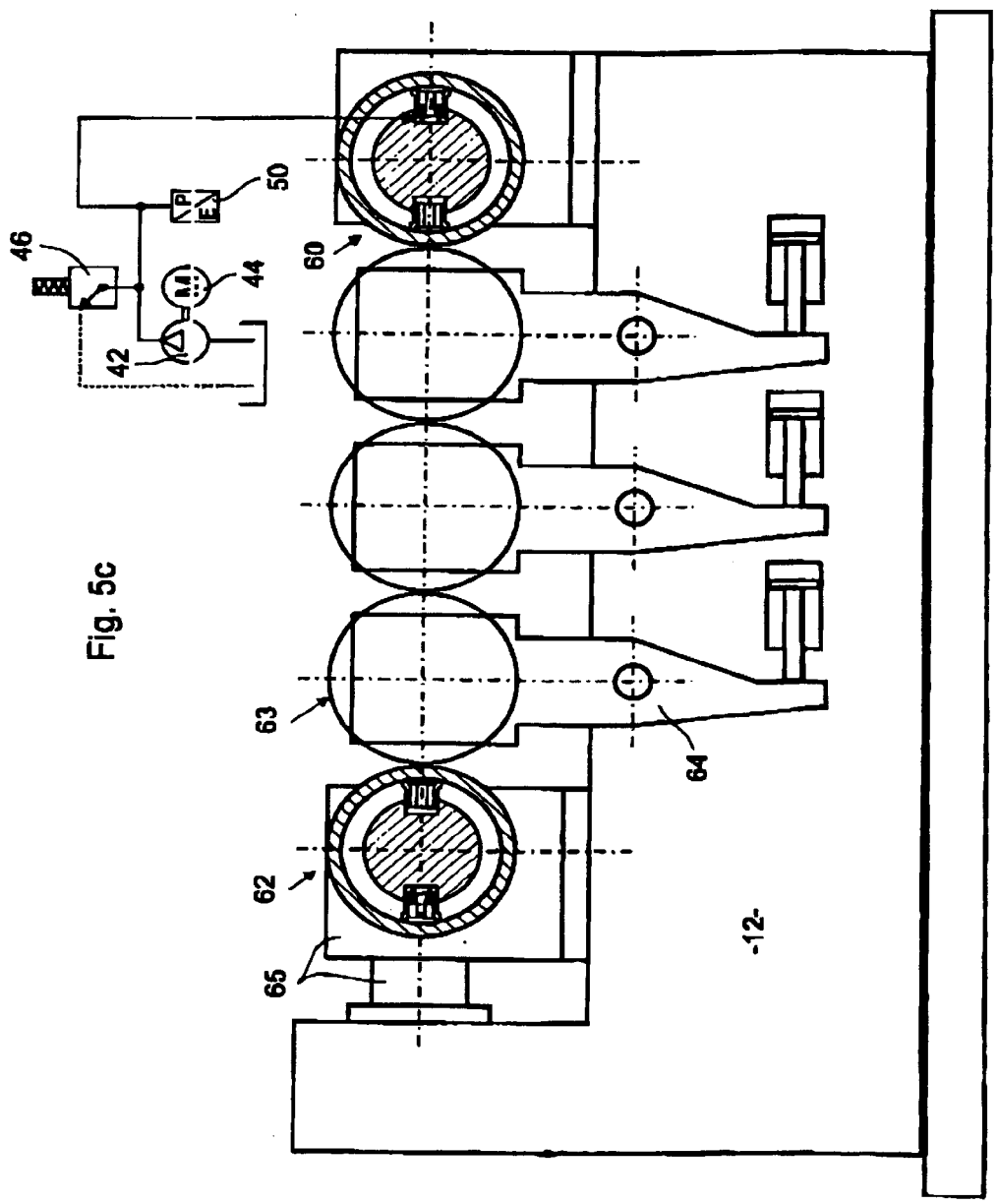

FIG. 1 shows a first embodiment of a self-loading deflection controlled roll that can be used, for example, as a lower end roll 62 of a calender arrangement, which deflection controlled roll has a roll axle 10, the projecting ends of which can be secured against rotation in a calender frame 12 (merely indicated) (see FIG. 5). Mounted to rotate about the roll axle 10 is a roll sleeve 14, which can be displaced radially relative to the roll axle 10 by means of at least one guide insert, for example side supports 11, and which is supported on the roll axle 10 by means of radially displaceable hydrostatic support elements 16. The roll axle 10 is spaced on all sides from the internal circumference 13 of the roll sleeve 14 so that the roll sleeve 14 can be displaced vertically relative to the roll axle 10. The deflection controlled roll thus has a so-called internal stroke. The support elements 16 are oriented vertically upwards and carry the roll sleeve 14 in the embodiment according to FIG. 5a where the rolls are arranged in a vertical stack plane. Alternatively, the rolls may be arranged in an oblique stack plane (FIG. 5b) or in a horizontal plane (FIG. 5c).

The support elements 16 are in this case in the form of hydrostatic seal elements, as described, for example, in DE 3820974 C3 or DE 39 18 989 C1. In those specifications, support elements 16 act against the internal circumference 13 of the roll sleeve 14, which support elements are in the form of sealing members 15 that delimit hydrostatic bearing pockets 17, to which hydraulic pressure fluid can be supplied by way of first lines 18. The sealing members 15 are so guided as to be displaceable vertically in blind bores 19 in the roll axle 10, their extensibility being provided by way of a hydraulic piston/cylinder unit (not shown further) having associated pressure medium supply. Alternative developments of the support elements 16, as described, for example, in DE 31 19 387 C2, can also be used.

A plurality of such support elements 16, in this case, for example, 8, are arranged in a series extending along the length of the roll axle 10.

At least one stopper or stop elements 20 is/are provided on the roll axle 10, offset by 180° in the circumferential direction, that is to say on a diametrical or opposite line relative to the series arrangement of the support elements 16. According to the embodiment shown in FIG. 1, two stoppers 20 are preferably provided spaced from one another. The stoppers 20 are preferably hydraulically positioned hydrostatic stoppers 20 in the form of hydrostatic support elements having a securing stop, as shown in detail in FIGS. 2 and 3. According to FIG. 1, the stoppers 20 act, for example, in the downward direction whereas the support elements 16 act in the upward direction.

According to FIGS. 2 and 3, each stopper 20 comprises a sealing member or plunger 22 having a piston-like cylindrical body which is guided so as to slide in a bore 24 in the roll axle 10. An operating position shown in FIG. 2, in which the sealing member 22 is in a selectable extension position, is determined by stops. The stops are formed by headed bolts 28 which, at the same time, secure the sealing member 22 against twisting and which are attached into the roll axle 10. Heads 26 of the headed bolts 28 determine a clearly defined maximum extension position of the sealing member 22 and thus a clearly defined position relative to the roll axle 10. The heads 26 form the securing stop. The stopper 20 thus has a limited element stroke which can be selectably preset and constitutes a limitation to the stroke. The sealing member 22 is held in its operating position by hydraulic medium fed into a blind bore 38 by way of a line 37.

Two channels or passages 30 pass through the sealing member 22 and are supplied with hydraulic medium. The sealing member 22 makes contact at an end face or contact surface 32 that is matched to the internal circumference 13 of the roll sleeve 14. There are formed in the end face 32 at least one, preferably more, flat bearing pockets 23 which take up a substantial portion of the end face 32, so that rim-forming webs are all that remain thereof. The end face 32 together with the roll sleeve 14 delimits a gap 34 through which the hydraulic medium supplied via the channels 30 can emerge.

Hydraulic medium is supplied to the channels 30 by way of an inlet 36 formed in the roll axle 10. A supply line 40 extends through the roll axle 10 to a pump 42, driven by a motor 44, to a supply container 41.

The hydrostatic bearing pockets 23 of a stopper 20 are supplied with a constant oil or pressure medium volumetric flow and initially the flow is virtually without pressure. When the internal circumference 13 of the roll sleeve 14 draws closer to the bearing faces 32 of the stopper 20, as a result of which the seal gap 34 of the stopper 20 is produced, pressure corresponding to the constant volumetric flow builds up in the hydrostatic pockets 23 until a predeterminable target value is reached, and a gap height S (which is, in the 4, range, for example, about 50~i) is produced according to the corresponding gap flow. The contact pressure required for the hydraulically positioned hydrostatic stopper 20 is built up through the separate pressure oil line 37.

If, as a result of an inequality, caused by external disturbing forces acting upon the roll sleeve 14, the stopper 20 is pressed upwards through a slight stroke movement within the range of the seal gap 34, that is to say in the a range, the pressure in the stopper 20 rises and produces an opposite force which continues to rise until equilibrium is restored. The stopper 20 is, as a consequence, a position indicator responding by means of pressure value changes in the bearing pocket 23 to vertical roll sleeve displacements and producing an opposite force.

If the opposite force is unable to restore the equilibrium of the forces in the support and loading system and the pressure in the stopper 20 continues to rise to a predeterminable maximum pressure value, that rise in pressure triggers (by means of the transducer 50) a control signal which is sent to a controller 52 for the support elements 16 which so alters the supporting forces that a state of equilibrium in the region of the target pressure value is restored.

If, on the other hand, as a result of an inequality, the roll sleeve 14 moves away from the stopper 20 within the range of the seal gap 34, the pressure in the stopper 20 falls until equilibrium has been restored. If, when the pressure in the stopper 20 drops, the predetermined minimum pressure value is reached, a control signal is likewise sent to the controller 52 for the support elements 16 which, by way of a computer 54, so alters the supporting forces that a state of equilibrium in the region of the target pressure value is restored.

If the external disturbing forces acting upon the roll sleeve 14 are so great that it is not possible to compensate for them, there is a system malfunction. When the roll sleeve 14 moves upwards and the pressure in the stopper 20 rises to a predeterminable upper limit, a control signal causes a stack of rolls in a calender arrangement to open, indicating a system malfunction. Correspondingly, when the roll sleeve 14 moves downwards when there is a fall in pressure in the stopper 20 to a predeterminable lower limit, the stack of rolls is likewise opened (released), indicating a state of malfunction in the calender arrangement.

Figure 14A:
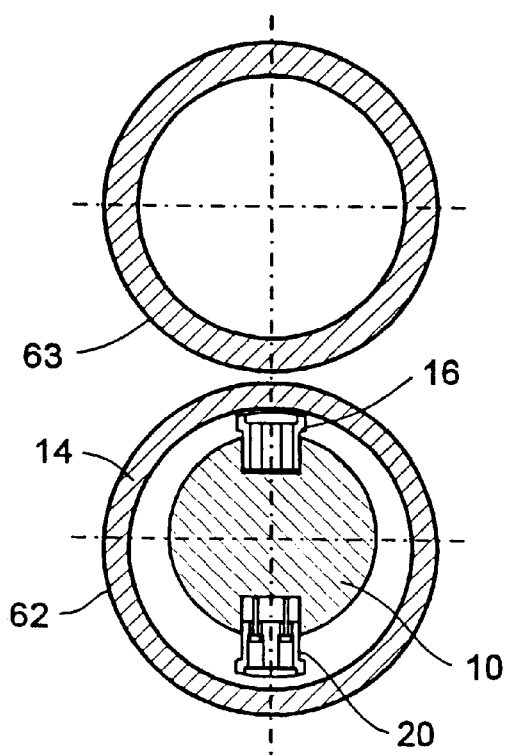
FIGS. 14a and 14b are diagrammatic cross-sections of a lower end roll and an intermediate roll arranged above it of a calender arrangement according to the invention, to illustrate the design principle and working principle of a calender.
Figure 14B:
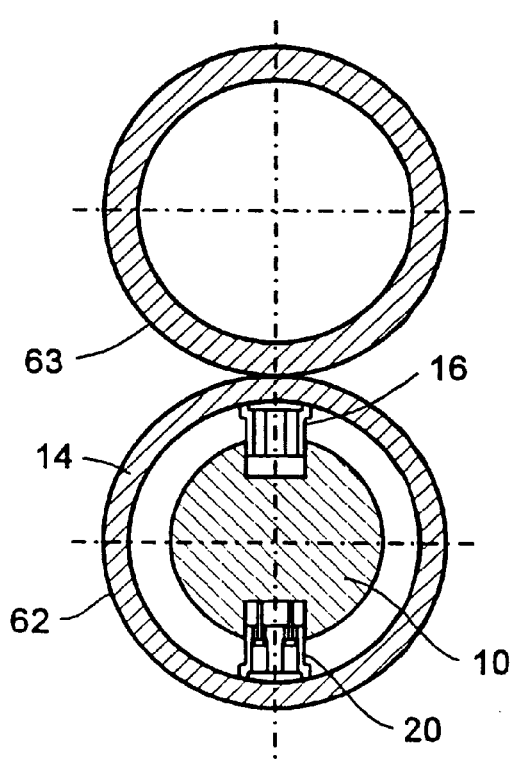

To close a stack of rolls of a calender arrangement according to FIGS. 14a and 14b, in which the above-described deflection controlled roll is arranged as a lower end roll 62, the following takes place. The volumetric flow of the hydraulic oil is sent to the two secured, backward-facing stoppers 20. The pressure at that moment is virtually zero since the roll sleeve 14 bears down in the bearings and the secured stoppers 20 have no contact with the roll sleeve 14. In the next step, a support piston pressure is activated at the hydrostatic support elements 16 and the roll sleeve 14 is thus raised. When the secured stoppers 20 make contact with the roll sleeve 14, backward-directed forces build up which prevent the roll sleeve 14 from rising further. The roll sleeve 14 is in the preset operating position. After closure of the stack of rolls, the roll sleeve 14 is clamped at that operating position hydraulically as explained above, it being possible to set the supporting forces of the support elements 16 according to the predeterminable line forces in the nips.

According to FIGS. 1 to 4, the pump 42 accordingly delivers a constant throughput, that is to say constant volume per unit of time, it being possible for the pump to be, for example, a gear pump or another positive-displacement pump. In addition to those volumetric pressure sources, volumetric flow distributors may also be used The pump 42 pumps against the pressure prevailing in the line 40 and is so configured that it can do so until a pressure determined by an overpressure valve 46 has been reached. The pressure in the line 40 is detected by means of a sensor 50, in this case a pressure sensor, and is routed to the controller 52 for the pressures for determining the supporting forces of the hydrostatic support elements 16.

Let it be assumed that the roll sleeve 14 has been completely lowered. This is shown, for example, in FIG. 14a, where the above-described deflection controlled roll forms a lower end roll 62 of a calender, above which roll there is arranged an intermediate roll 63. The nip lying between the two rolls 62, 63 is open.

The counter-pressure P in the line 40 in that position of the roll sleeve 14 is virtually zero because the gap width S of the seal gap 34 is very large and the hydraulic medium is recirculated by the pump 42.

If the support elements 16 are then acted upon by pressure medium, they raise the roll sleeve 14 in order to exert forces on a web of material passing through a nip, as shown in FIG. 14b. The roll sleeve 14 thus draws closer to the sealing member 22 of the stopper 20. The gap width S decreases, the pressure across the gap increases and a downward force is exerted on the roll sleeve 14. If the forces are in equilibrium, the roll sleeve 14 is in a position corresponding to a gap height S1 in which pressure P1 prevails in line 40. This is the case when a target position and the actual position coincide.

If the position of the roll sleeve 14 departs from its target position, for example in the direction of a narrower gap and a higher pressure, the controller for setting the supporting forces of the hydrostatic support elements 16 would normally intervene to restore the target position. In the context of the invention it is, however, permitted for the actual position to depart from the target position between an upper limit P2/S2 and a lower limit P3/S3 (see FIG. 4) without intervention on the part of the controller. The result is that the stoppers 20 define a "pseudo-stop" which is so configured that it will, by damping, take up any impacts. Only if the pressure exceeds the value P2 or falls below the value P3 will the controller intervene and try to restore the roll sleeve 14 to its target position. If, however, the maximum pressure P4 (predetermined by the pressure limiter 46) is reached, the calender arrangement will switch itself off since the predetermined control range of the controller will have been exceeded. The same applies when the pressure falls below a pressure P5.

In a variant, over the pressure range P2 to P3 it is possible to integrate, on the one hand, instances where the pressure falls below pressure P1 and, on the other hand, instances where pressure P1 is exceeded, and to determine the quotient of the two integrals. That quotient signal then indicates to the controller the trend in the change of position of the roll sleeve 14. In a further variant, the controller can also permit instances where P2 is exceeded and instances where the pressure falls below P3, provided they do not last beyond a predetermined period of time. Account should be taken of the fact that the controller has to be in control of a large number of interconnected control circuits, which means that it needs time to evaluate any control signals. Even if, as is customary in calenders, a high-speed computer is used, the computer still requires a few tenths of a second of computing time, whilst brief, possibly periodic disturbances may occur in the gap 34 which are the result, for example, of unavoidable imbalances in the roll sleeves and/or intermediate rolls of a calender arrangement.

The geometry of the stoppers 20, especially the active diameter and the gap length, are variable within wide limits, with the result that it is possible to set the pseudo-stop to be on the rigid side or on the yielding side. As already explained above, in principle a single stopper 20 would suffice, but two are preferred because any tendency of the roll sleeve to become skewed can thus be detected and avoided.

As explained above, during operation the plunger 22 is in permanent contact with the bolt heads 26, with the result that it could actually be fastened in a fixed position on the roll axle 10. Its ability to be displaced into the axle is a safety measure in order to avoid frictional contact between the roll sleeve 14 and the stopper 20 under any circumstances.

Moreover, it is also possible to use quasi-volumetric or non-volumetric pressure sources. It is then important, however, that in the case of the necessary maximum pressure that can prevail in the stopper 20, there is still a minimum flow which safeguards the hydrostatic function for that operating state as well. Hydrostatic function means that mixed friction does not occur between the end surface 32 of the sealing element 22 and the internal wall 13 of the roll sleeve 14, and damage due to wear can be reliably avoided at those sites.

FIG. 5a is a diagrammatic, partly sectional side view of a calender arrangement according to the invention, in which the rolls are arranged along a vertical stack plane and where the upper end roll 60 is provided with the positioning device. The lower end roll 62, however, also has the necessary built-in components so that all that is needed is to provide a roll design that can be used either as an upper or lower end roll, yielding logistical advantages. Intermediate rolls 63 are arranged between the upper end roll 60 and the lower end roll 62. The intermediate rolls 63 are arranged to be movable vertically by means of lever mechanisms 64. The bearings of the lower end roll 62 are also adjustable vertically by means of a lifting device 65. The stoppers 20 in the upper end roll 60 are arranged on the backward-facing side of the roll. The same applies to the lower end roll 62.

It is preferable for the roll sleeve of the lower end roll to be positioned. The stoppers in the upper end roll then drop into the axle and have no contact with the internal wall of the roll sleeve.

According to FIG. 5b, the rolls 60, 62, 63 are arranged along an oblique stack plane. The intermediate rolls 63 are arranged to be movable in the oblique direction by means of lever mechanisms 64. The bearings of the lower end roll 62 are also adjustable oblique by means of lifting device 65.

According to FIG. 5c, the rolls 60, 62, 63 are arranged along a horizontal stack plane.

The intermediate rolls 63 are arranged to be horizontally movable by means of lever mechanisms 64. The bearings of the end roll 62 are also adjustable horizontal by means of a displacement device 65.

Figure 6:
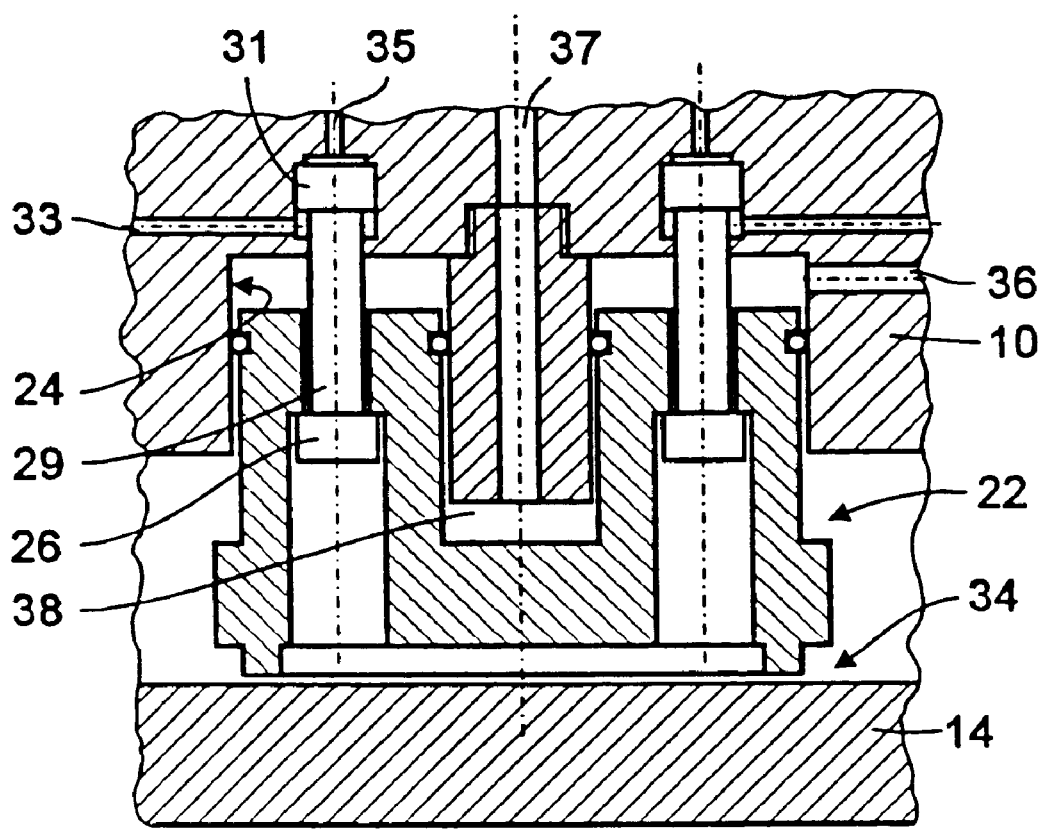
FIG. 6 shows a modified stopper.

FIG. 6 shows a stop element that has been modified with respect to FIG. 2; components having the same function have been given the same reference numerals as in FIG. 2. The screw bolts 28 from FIG. 2 are here replaced by tappets 29, the axle-facing end of which carry a piston 31. Supplied with hydraulic medium via line 33 or line 35, the tappets can adopt an upper end position (as shown) or a lower end position, so that two different target positions of the roll sleeve can be selected without having to take the roll apart. The pressures in the lines 33, 35 and 37 must of course be in agreement with one another so that the plunger 22 is always held in the desired end position.

Figure 7:
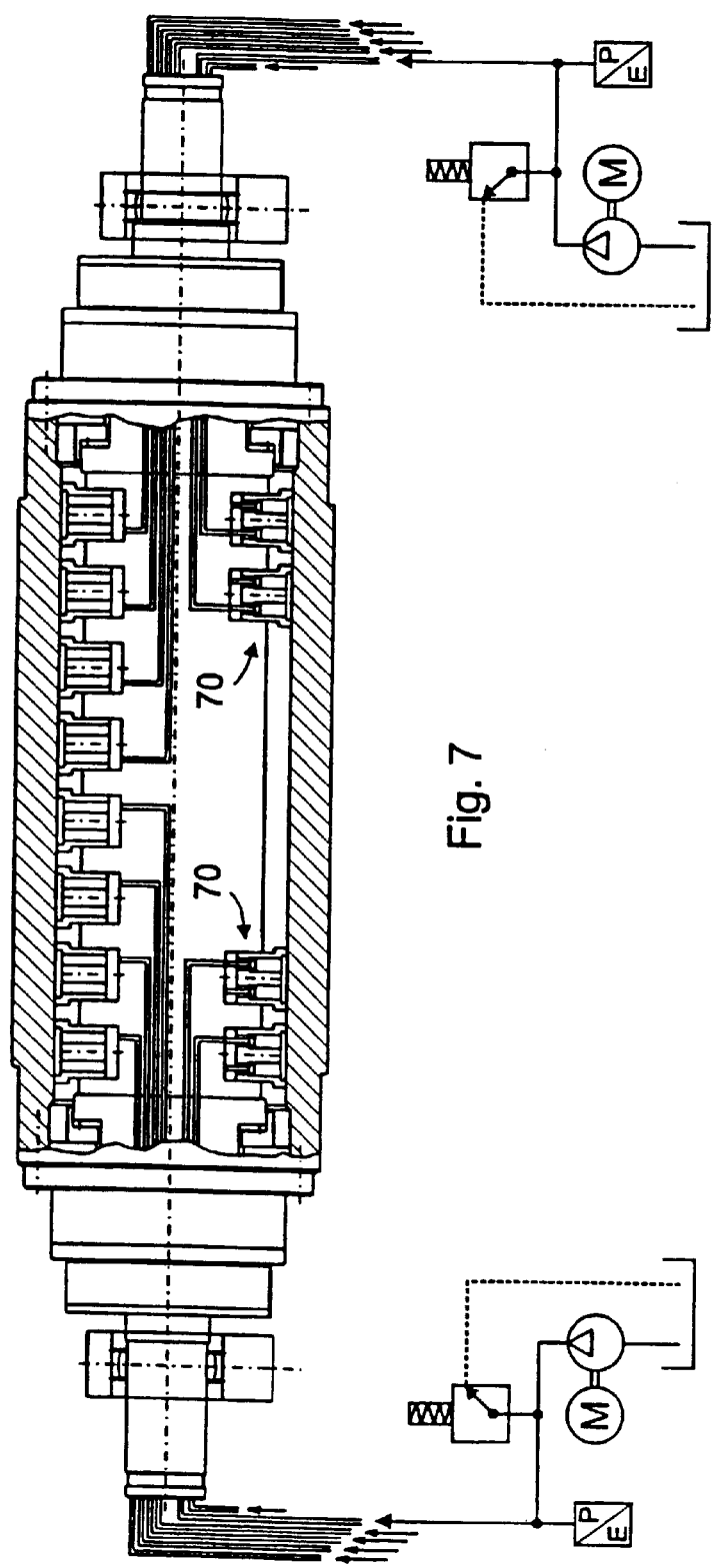
FIG. 7 is a longitudinal section of a deflection controlled roll having stoppers according to a second embodiment.
Figure 8:
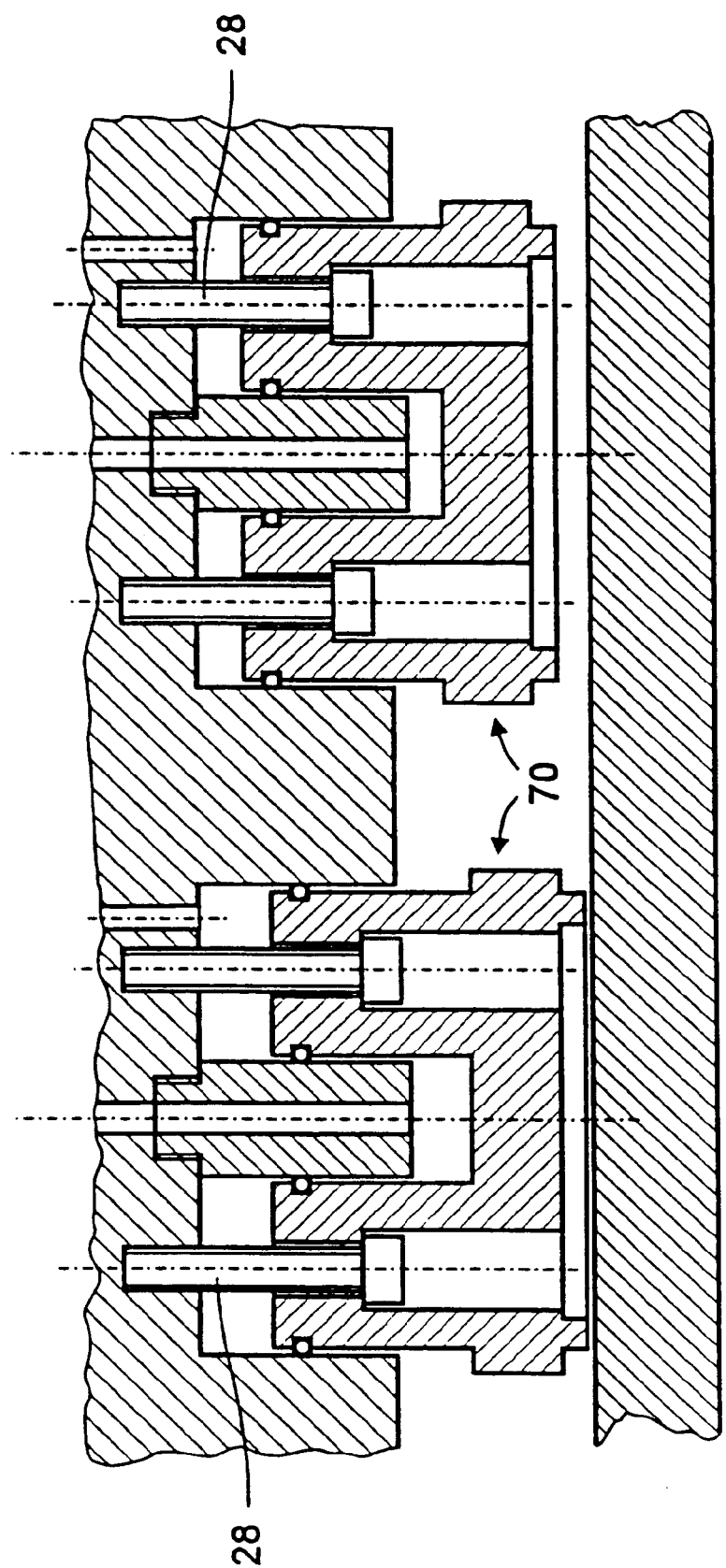
FIG. 8 is an axial section through a pair of stoppers according to FIG. 7.

Another possibility for presetting different target positions of the roll sleeve is shown in FIGS. 7 and 8. Instead of the two stoppers 20 from FIG. 1, two pairs of stoppers 70 are provided, the stoppers 70 forming each pair having bolts 28 of different lengths. Only one stopper in each pair is acted upon by hydraulic medium, whereas the other has a pressure-free connection. In FIG. 8 the stopper shown on the lefthand side is active. Further target positions for the roll sleeve can of course also be preset by groups of three or even more stoppers.

Insofar as the above has taken as its reference only a vertical stack of rolls, it relates only to the customary manner of calender construction. The invention could of course also be used if the plane defined by the roll axles had a different spatial orientation.

Figure 9:
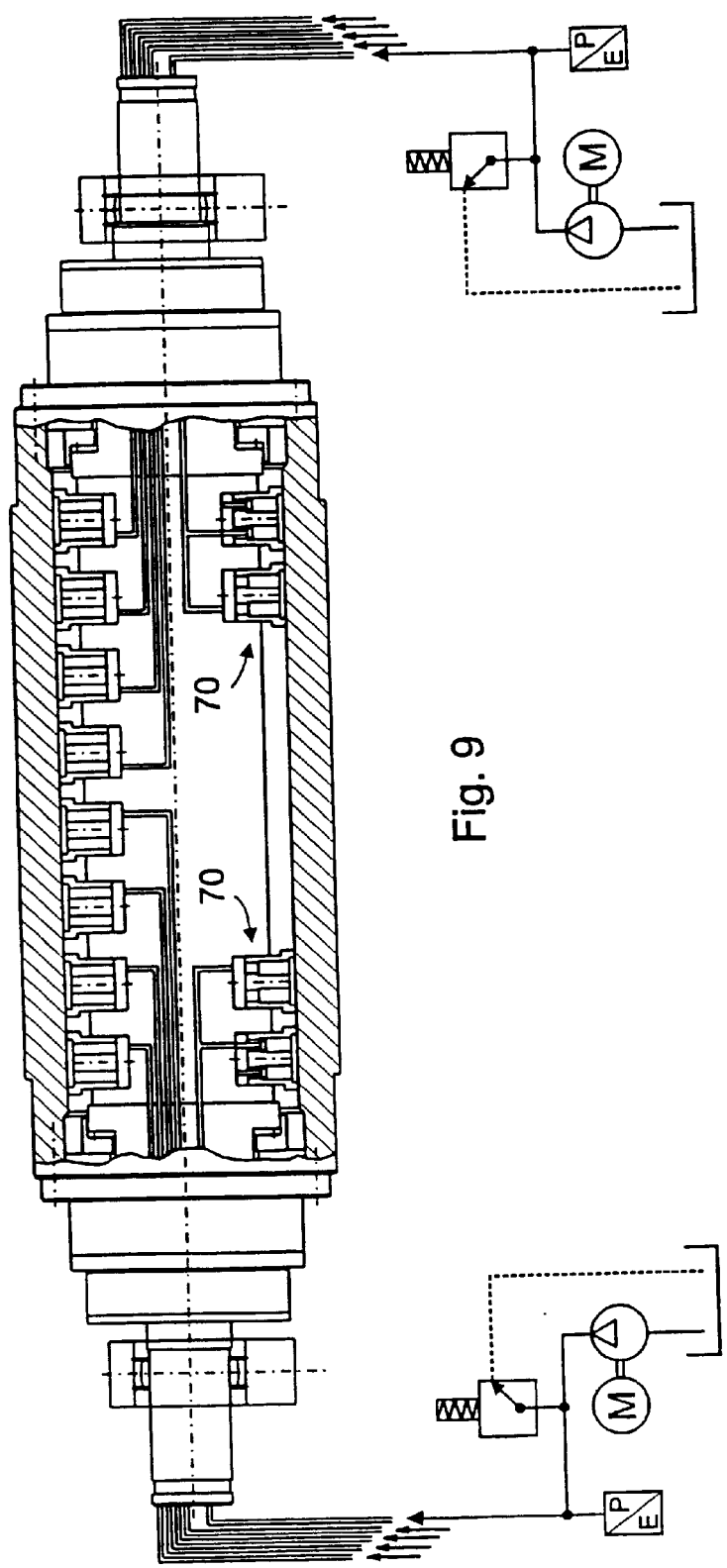
FIG. 9 is a longitudinal section of a deflection controlled roll having stoppers according to a third embodiment.
Figure 10:
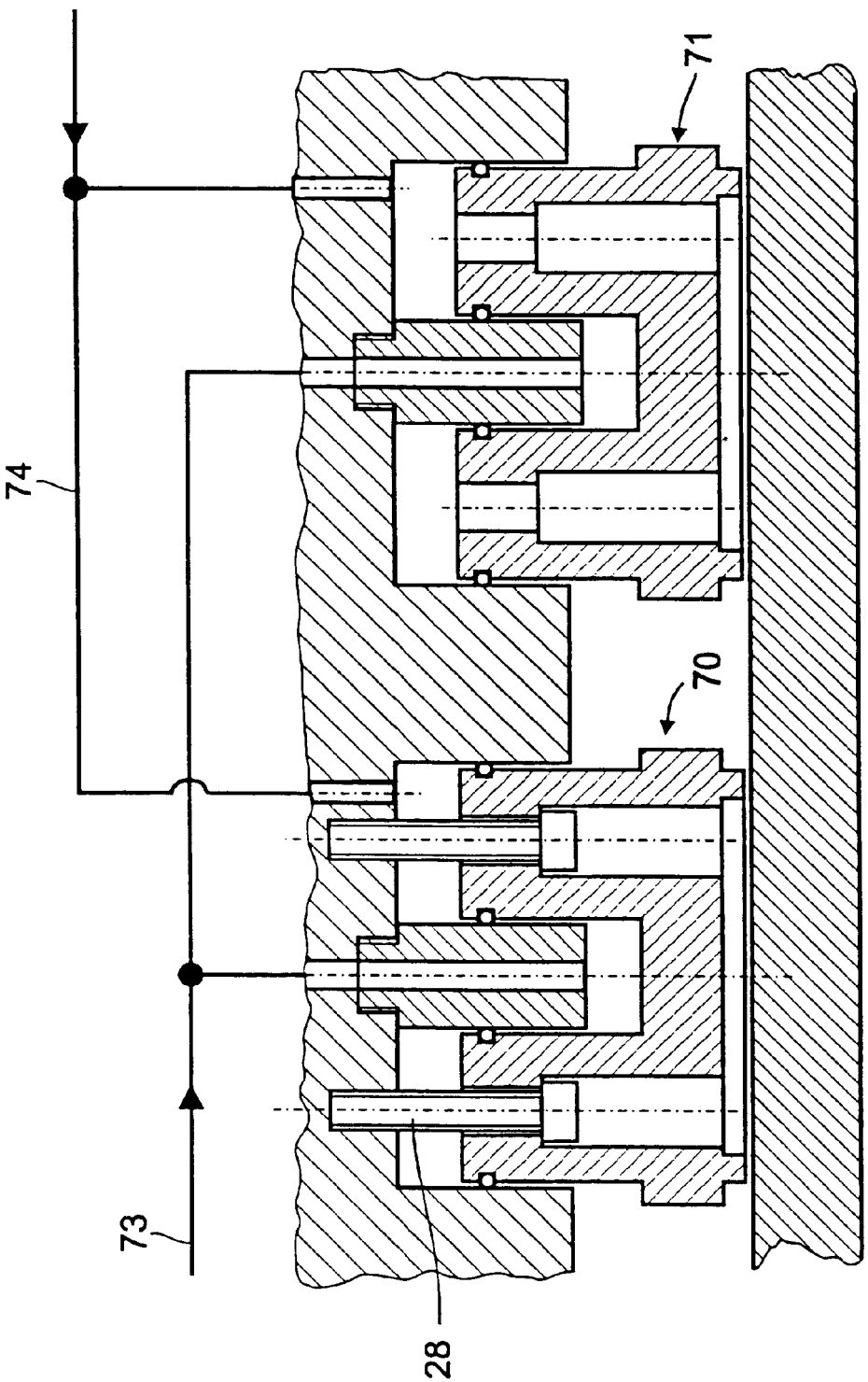
FIG. 10 is an axial section through a stopper/support element pair according to FIG. 9.

FIGS. 9 and 10 show a third embodiment of a suitable deflection controlled roll in which a stopper 70 is provided with a holding bolt 28 and forms a group with at least one hydrostatic support element 71 without a holding bolt. In that variant the support element 71 without a holding bolt always rests against the internal circumference 13 by means of a support piston pressure, that is to say even when the roll sleeve 14 has moved away from the stopper 70. For that purpose the elements 70, 71 are connected via lines 73, 74 to a common pressure supply line having a volumetric pressure source.

Figure 11:
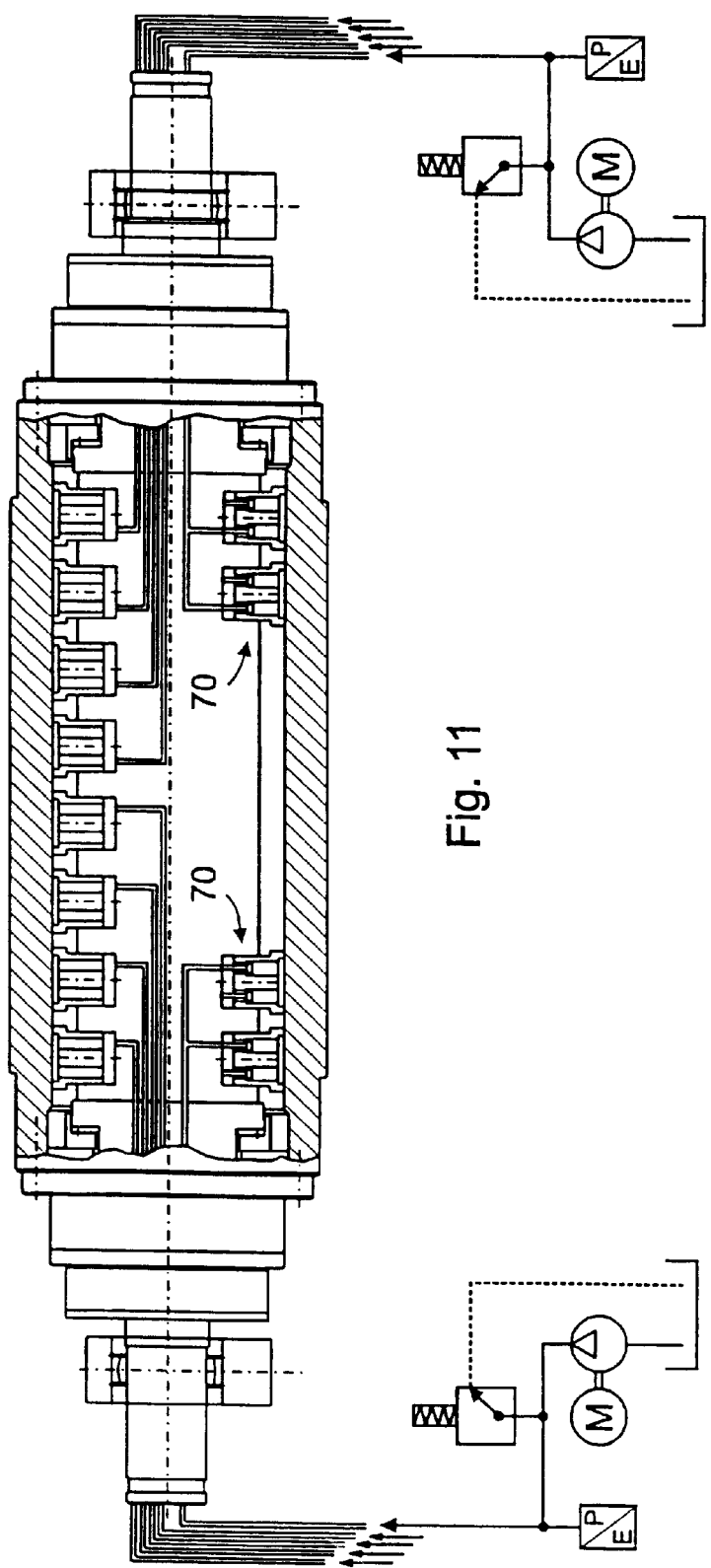
FIG. 11 is a longitudinal section through a deflection controlled roll having stoppers according to a fourth embodiment.
Figure 12:
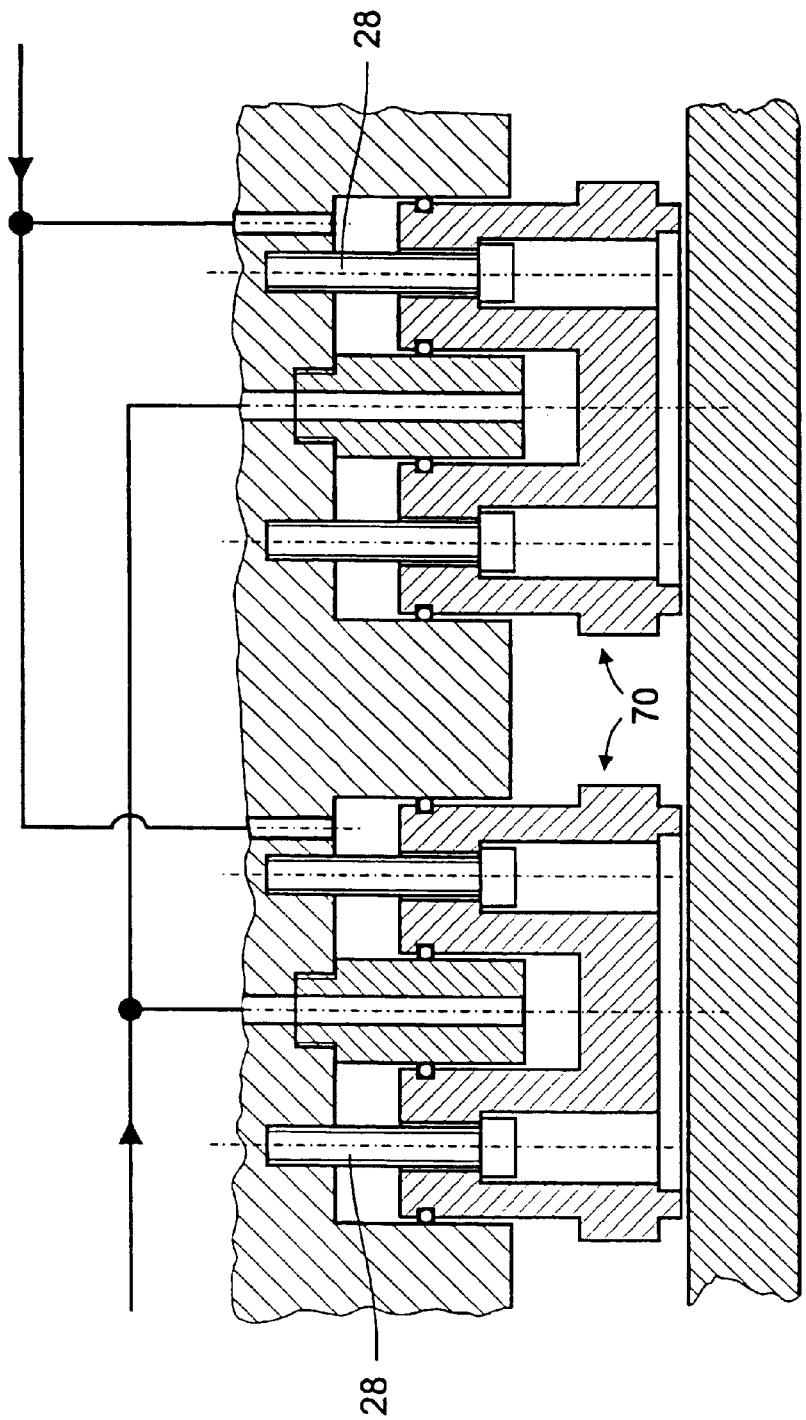
FIG. 12 is an axial section through a pair of stoppers according to FIG. 11.

In the fourth embodiment according to FIGS. 11 and 12, in a group of a plurality of stoppers 70 all the stoppers are provided with holding bolts 28 of the same length and are connected to a common volumetric pressure source. That configuration avoids the mentioned disadvantage of the third embodiment since, after the roll sleeve has moved away from the stopper 70, all the elements are limited in their stroke by their holding bolts 28 and thus can not follow the movement of the roll sleeve further. The functional operation of that solution is also safeguarded when the lengths of the holding bolts 28 have unavoidable tolerance differences.

The operating position of the roll sleeve is then determined by the element 70 having the shortest holding bolt 28.

Figure 13:
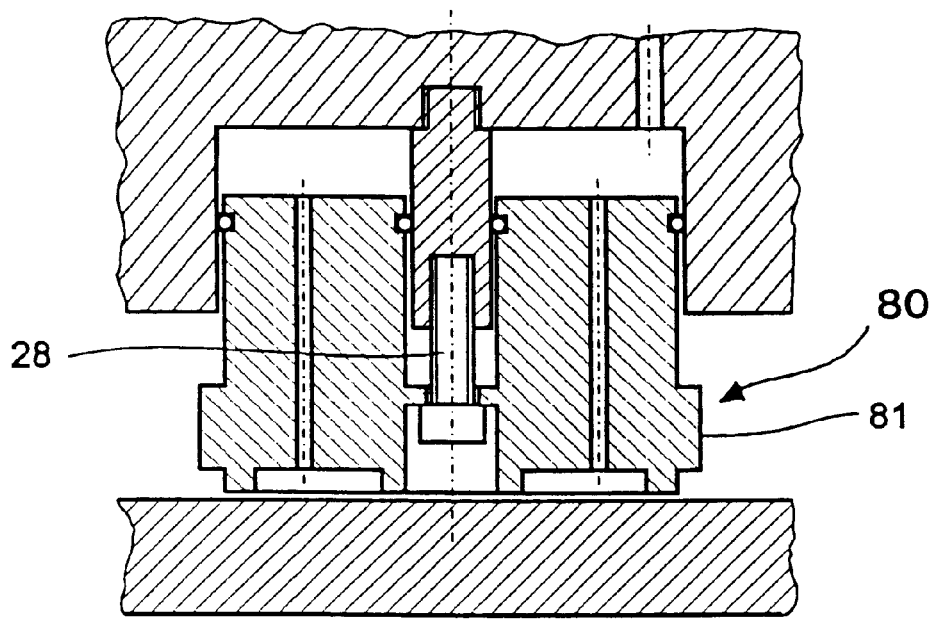
FIG. 13 shows a differently modified stopper.

Finally, FIG. 13 shows a construction of a stopper 80 in the form of a hydrostatic support element having holding bolts 28 using a hydrostatic support plunger 81.

What is claimed is:

1. A calender comprising:
   a frame; and
   a number of rolls arranged in a stack on the frame; said stack defining a stack plane, in which the rolls are arranged to form nips including end rolls at opposite ends;
   wherein the end rolls each comprise:
      a roll axle non-rotatingly secured to the frame;
      a roll sleeve received over the roll axle so that said roll sleeve can both rotate and move radially in the direction of the nips relative to the roll axle;
      a plurality of first hydrostatic support elements mounted on the roll axle, which support elements can be displaced in the direction of the nips to move the roll sleeve relative to the roll axle; and
      at least one stop element mounted on the roll axle which acts on the roll sleeve in a direction opposite to that of the first hydrostatic support elements;
   wherein the stop element comprises;
      a second hydrostatic support element including a piston which is positioned in a cylinder bore and on which a pressure element is applied to move the piston radially under force relative to the roll axle; and a stop member to adjustable limit such radial movement to a predetermined maximum displacement relative to the roll axle to place a surface of the piston next to an inner surface of the roll sleeve by including a seal gap, and
      means for delivering a constant flow rate of a hydraulic medium into the cylinder bore, and the piston having passages through which said fluid flows into and out of the seal gap.

2. A calender as in claim 1, wherein the stack plane is vertical, oblique or horizontal.

3. A calender as in claim 1, further comprising a control device connected to monitor the pressure of the hydraulic medium flowing through the gap, wherein a decrease in the gap increases the pressure and a decrease in the gap increases the pressure.

4. A calender as in claim 1, wherein the rolls each include at least two stop elements disposed symmetrically with respect to the middle of the length of the sleeve.

5. A calender as in claim 4, wherein the at least two stop elements are spaced inwardly from each end of the sleeve by one-quarter the length of the sleeve.

6. A calender as in claim 1, wherein the stop member comprises at least one bold.

7. A calender as in claim 6, wherein the bolt includes a bolt head which is adjustably positionable relative to the axle.

8. A calender as in claim 7, further comprising means for hydraulically adjusting the position of the bolt head relative to the axle.

9. A calender as in claim 6, comprising a plurality of hydrostatic bearings each having at least two bolds having different lengths.

10. A calender as in claim 1, further comprising a pump and a supply line which connects an output of the pump to the hydrostatic supports.

11. A calender as in claim 10, wherein the pump comprises a positive displacement pump.

12. A calender as in claim 11, further comprising a pressure limiting valve in the supply line.

13. A calender as in claim 10, further comprising a pressure monitoring device connected to monitor pressure in the supply line and a control device connected to the pressure monitoring device.

14. A calender as in claim 13, wherein the control device adjusts a stroke of the internal sleeve whenever pressure in the supply line exceeds a predetermined upper or lower threshold.

15. A calender as in claim 10, wherein the means for delivering a constant flow rate of the hydraulic medium comprises the pump.

16. A deflection controlled roll for use with a calender for treating a product web,
said roll comprising:
a non-rotating roll axle;
a roll sleeve received over the roll axle so that said roll sleeve can both rotate and move radially to the roll axle; and
inside loading means disposed in at least one row on the non-rotating axle for supporting the roll sleeve, said inside loading means for comprising;
a plurality of first hydrostatic supports which are radially displaceable relative to the non-rotating roll axle to provide an internal roll sleeve stroke;
at least one stop element disposed on a side of the non-rotating roll axle opposite to the hydrostatic supports, said element comprising:
a second hydrostatic support element including a piston which is positioned in a cylinder bore and on which a pressure element is applied to move the piston radially under force relative to the roll axle; and a stop member to adjustable limit such radial movement to a predetermined maximum displacement relative to the roll axle to place a surface of the piston next to an inner surface of the roll sleeve by including a seal gap, and
means for delivering a constant flow rate of a hydraulic medium into the cylinder bore, and the piston having passages through which said fluid flows into and out of the seal gap.

17. A deflection controlled roll as in claim 16, further comprising a device for measuring a change in pressure in the gap between a surface of the piston and an inner surface of the roll sleeve and a signal indicator connected to the pressure charge measuring device which indicates radial position change of the roll based on a change in pressure.

18. A deflection controlled roll as in claim 17, wherein the pressure change measuring device comprises a pressure sensor which measures a pressure of the hydraulic medium.

19. A deflection controlled roll as in claim 17, further comprising a control device which controls the hydraulic medium delivering means in response to the pressure measured by the pressure measuring device.

20. A deflection controlled roll as in claim 16, further comprising a pressure limiting valve connected to the hydraulic medium delivering means to limit a maximum pressure in the gap.

21. A deflection controlled roll as in claim 16, further comprising a pump and a supply line which connects an output of the pump to the hydrostatic supports.

22. A deflection controlled roll as in claim 21, wherein the pump comprises a positive displacement pump.

23. A deflection controlled roll as in claim 21, wherein the hydrostatic supports comprise hydrostatic bearing pockets connected to the supply line.

24. A deflection controlled roll as in claim 23, further comprising a seal around the bearing pocket.

25. A deflection controlled roll as in claim 16, wherein the stop element comprises at least one bolt which is adjustably positionable relative to the axle.

26. A deflection controlled roll as in claim 16, including at least two step elements disposed symmetrically with respect to the middle of the length of the sleeve.

27. A deflection controlled roll as in claim 26, wherein the at least two stop elements are spaced inwardly from each side of the sleeve by one-quarter the length of the sleeve.

28. A method for calendering a web, said method comprising:
passing the web through nips between rolls arranged in a stack along a stack plane, including deflection controlled end rolls and intermediate rolls between said deflection controlled end rolls,
delivering a pressure of force to at least one of said deflection controlled end rolls, being a self-loaded roll, to maintain a predetermined value of an internal stroke length,
delivering a hydraulic medium at a constant flow rate to that at least one deflection controlled end rolls, wherein the hydraulic medium flows between a gap between a hydrostatic support element and an inner surface of the roll sleeve so that a radial movement of the roll sleeve narrowing the gap increases the pressure of the hydraulic medium to keep the gap and movement of the roll sleeve enlarging the gap decreases the pressure of the hydraulic medium to keep the gap.

29. A method as in claim 28, further comprising measuring the pressure of the hydraulic fluid, comparing the measured pressure with a target pressure, and adjusting the position of the at least one upper and lower deflection controlled rolls based on a difference between the measured and target pressures.

* * * * *